United States Patent [19]

Laüfer

[11] 3,948,676

[45] Apr. 6, 1976

[54] PROCESS FOR PREPARING HYDROPHOBIC PARTICLES

[75] Inventor: Siegmar Laüfer, Rheinfelden, Germany

[73] Assignee: Deutsche Gold- und Silber-Scheideanstalt vormals Roessler, Frankfurt am Main, Germany

[22] Filed: May 23, 1974

[21] Appl. No.: 472,924

Related U.S. Application Data

[63] Continuation-in-part of Ser. No. 201,487, Nov. 21, 1971, abandoned.

[30] Foreign Application Priority Data

Nov. 24, 1970  Germany............................ 2057731

[52] U.S. Cl. ......... 106/309; 106/308 Q; 106/308 N
[51] Int. Cl.² ......................................... C09C 1/28
[58] Field of Search........ 106/308 N, 308 Q, 288 Q, 106/309; 117/100 S, 100 B

[56] References Cited
UNITED STATES PATENTS

| | | | |
|---|---|---|---|
| 3,556,830 | 1/1971 | Charrin............................... | 106/309 |
| 3,558,337 | 1/1971 | Barnes.............................. | 106/288 B |
| 3,635,743 | 1/1972 | Smith............................... | 106/288 Q |
| 3,649,588 | 3/1972 | Kennedy-Shipton............. | 106/308 Q |
| 3,720,532 | 3/1973 | Simpson........................... | 106/308 Q |

*Primary Examiner*—Winston A. Douglas
*Assistant Examiner*—Jacqueline V. Howard
*Attorney, Agent, or Firm*—Beveridge, DeGrandi, Kline & Lunsford

[57] ABSTRACT

A process for preparing hydrophobic finely divided oxides of metals and/or oxides of silicon comprising activating finely divided particles of oxides of metals and/or oxides of silicon by heating the particles at about 700° – 1000°C for less than about 60 seconds in a stream of inert gas to substantially completely free the particles of not only the physically bonded, but also the chemically bonded water, and contacting the activated particles with at least one organosilicon compound and substantially anhydrous ammonia gas for less than about 60 seconds. The hydrophobic products are useful as fillers in elastomers.

48 Claims, No Drawings

PROCESS FOR PREPARING HYDROPHOBIC PARTICLES

This application is a continuation-in-part of application Ser. No. 201,487 filed Nov. 21, 1971 now abandoned.

This invention relates to a process for preparing hydrophobic particles. More particularly it relates to a process for preparing hydrophobic finely divided oxides of metals and/or oxides of silicon by treating particles with organosilicon compounds and ammonia.

It is known in the art that finely divided particles can be rendered hydrophobic by altering their surface characteristics. Typical of particles treated are finely divided silicic acids produced by precipitation or pyrogenic processes.

One process for rendering precipitated silicic acids hydrophobic involves the well known "slurry technique." In the case of finely divided pyrogenic silicic acids, a well known process for rendering particles hydrophobic involves treating the particles with agents derived from silicon compounds in a heterogeneous gas phase. For example, DAS 1 163 784 teaches that finely divided pyrogenic acids can be rendered hydrophobic by treating particles with an alkyl chlorosilane in a fluidized bed.

An older process involves thermally activating silicic acid particles, and treating the activated particles at elevated temperatures with volatile alkyl siloxanes, for example $D_4$ (octamethyl cyclotetra-siloxane), in a gas phase.

According to another process, finely divided silicic acid particles of any origin can be rendered hydrophobic by first activating the particles, then treating the activated particles with alkyl or aryl alkoxy silanes, or alkyl or aryl alkoxy siloxanes. These silanes and siloxanes are used in a gaseous state or as an atomized spray in a heterogeneous gas phase.

While the first two mentioned processes yield satisfactory products, they require costly processing equipment. The last mentioned process does not require as extensive an expenditure for processing equipment as do the first two, but it has been found that alcohols used in the process adhere to the finely divided particles. For some applications, small quantities of alcohols adhering to the particle can be tolerated. Nevertheless, for other applications it is desired that the particles be as free of volatile contaminants as possible with the least expenditure for processing equipment possible.

It has been suggested that volatile silanes or siloxanes be used. For example, alkyl alkoxy silanes or alkyl alkoxy siloxanes having alkoxy radicals derived from volatile alcohols, such as methanol, have been suggested. But experience has shown that silicic acid particles treated with alkoxy derivatives of the higher, less volatile alcohols possess superior characteristics. It has also been found that these less volatile higher alcohols are liberated during processing, and can only be separated from the hydrophobic particles with great difficulty. Furthermore, there are instances where the less volatile higher alcohols cannot be completely removed from the particles, and even small residues may be undesirable because of their unpleasant odors.

It is also known tht silicic acid particles having particularly good hydrophobic characteristics can be obtained by using alkyl alkoxy silanes having long alkyl chains. In this instance, however, the alkoxy radical is derived from a lower alcohol because the boiling point of the silane rises rapidly with increasing alkyl chain length. Residual higher boiling silanes are more difficult to remove from the hydrophobic particles. Furthermore, the larger the number of carbon atoms in the alkyl or alkoxy radicals of an alkyl or aryl alkoxy silane and alkyl alkoxy siloxanes with longer carbon chains, (e.g. $C_n$ where $n > 2$) require such long reaction times at normal temperatures and in the absence of a catalyst that they are not generally practical for industrial use. This is true even if the most highly active silicic acids are treated with the silanes and siloxanes.

It is known that the alkyl alkoxy silanes and alkyl alkoxy siloxanes having long carbon chains can be used in industrial processes if a trace of HCl, such as 0.1%, is simultaneously added with the silicon compound. Hydrophobic silicic acid particles can be produced within a few minutes or up to an hour depending on the alkyl alkoxy silanes or alkyl alkoxy siloxanes used, and on the nature of the alkyl and alkoxy radicals. The product produced by this method is not entirely satisfactory because residual acid (HCl) adheres to the particles making them unsuitable for certain applications, such as in silicone rubbers.

It is apparent from the foregoing discussion that silicic acid particles can be rendered hydrophobic by treatment with alkyl alkoxy silanes or alkyl alkoxy siloxanes without the use of catalysts. Nevertheless, there still exists a need for a method of rendering particles hydrophobic by treatment at room temperature (e.g., about 20° – 60°C), without the use of acid catalysts, in a reaction time suitable for industrial use, and with a minimum of costly processing equipment.

U.S. Pat. No. 3,334,062 teaches a method of treating finely divided inorganic substances, including silicic acids, to obtain hydrophobic products which are suitable as fillers in elastomers, rubber and synthetic resins. The method involves treating particles having a water content of at least 1% by weight with cyclotrisiloxane in the presence of ammonium compounds, such as ammonium hydroxide and ammonium carbonate, at 15° – 170°C for 5 minutes to several hours. This process is limited to the use of cyclotrisiloxane; use of cyclotetrasiloxanes, for example $D_4$, yields hydrophilic products, not hydrophobic products. Thus, there has also existed a need for a process having broader application than such heretofore known narrow processes.

Accordingly, this invention provides a process for preparing hydrophobic finely divided oxides of metals and/or oxides of silicon. The process comprises activating finely divided particles of oxides of metal and/or oxides of silicon by heating the particles at about 700° – 1000°C for less than about 60 seconds, typically about 1 to less than about 60 seconds, in a stream of inert gas to substantially completely free the particles of not only the physically adsorbed, but also chemically bonded water. The activated particles are then contacted with at least one organosilicon compound and substantially anhydrous ammonia gas for less than about 60 seconds, typically about 1 to less than about 60 seconds.

The organosilicon compound is preferably selected from the group consisting of organo-cyclo-siloxanes, organoalkoxy silanes, organo-alkoxy-siloxanes and organosiloxanes. The ammonia acts as a catalyst, and leads to the production of stable hydrophobic products by means of a simple process. The products are chemically neutral and free of volatile residues, such as alcohols. Use of acid catalysts is eliminated. A wide range of organosilicon compounds can be used, including those well known in the art, such as the linear hexamethylcyclotrisiloxane (D₂), the cyclic hexamethyl-cyclotrisiloxane (D₃) and octamethyl-cyclotetrasiloxane (D₄). The process of this invention is not limited to these known compounds.

The oxide particles are first activated by heating the particles at about 700° – 1000°C for less than about 60 seconds in a stream of inert gas. The particles are completely freed of chemically bonded water and moisture. As used herein, an inert gas is one which does not react with the oxide particles or ammonia. It is preferred to activate the particles in a fluidized bed.

The particles are then contacted with at least one organosilicon compound and for a few seconds with anhydrous ammonia. The activated particles can be first contacted with the ammonia gas, and then with the organosilicon compound. This order can be reversed, for example, by first contacting the activated particles with the organosilicon compound, then with the ammonia gas. Another alternative involves contacting the activated particles with the organosilicon compound and ammonia simultaneously.

The oxide particles can be activated in an activation zone, then contacted with anhydrous ammonia gas in a reaction zone immediately behind the activation zone. The oxide particles can also be activated in a fluidized bed. The organosilicon compound can be mixed with the oxides at a temperature above about 20°C, preferably about 20° – 60°C. Further, the oxide particles can be contacted with the anhydrous ammonia gas at ambient temperature, preferably about 20° – 60°C. Additionally, the organosilicon compound can be mixed with the oxide particles at standard pressure and ambient temperature (e.g. about 20° – 60°C), and the resulting mixture contacted with anhydrous ammonia gas.

Examples of oxides of silicon which can be employed in the process of this invention are precipitated silicas and pyrogenic silicas.

From the group of organoalkoxy silanes, compounds of the following general formula can be used:

$$R_n Si(OR')_{4-n}$$

in which R is an alkyl radical having about 1 – 12 carbon atoms (i.e. a C₁-C₁₂ alkyl), preferably about 1 – 8 carbon atoms or an aryl radical such as phenyl or naphthyl, and R' is an alkyl radical having about 1 – 8 carbon atoms, (i.e. a C₁-C₈ alkyl) and n is the integer 1, 2 or 3. Preferably, the sum of the number of carbon atoms in any radical R plus the number of carbon atoms in any other radical R' does not substantially exceed 9 or is 9 or less. Also, it is preferred that either a radical R or a radical R' in the organoalkoxy silane has about 3 – 8 carbon atoms and a radical R' has about 1 – 3 carbon atoms. In a further preferred embodiment, an R of the organoalkoxy silane has about 6 – 8 carbon atoms, and R' is methyl.

From the group of organoalkoxy siloxanes or organoalkoxy-oligo siloxanes, compounds of the following general formula can be used;

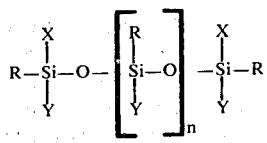

wherein

X is R or OR',
Y is R or OR' and
R is an alkyl radical with 1 – 6 carbon atoms or an aryl radical, such as phenyl or naphthyl,
R' is an alkyl radical with 1 – 8 carbon atoms, and
n is the number zero or 1.

From the group of organoalkoxy cyclosiloxanes, compounds of the following general formula can be used:

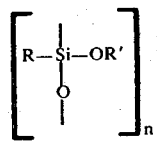

in which R is an alkyl radical having about 1 – 12 carbon atoms or an aryl radical, and R' is an alkyl radical having about 1 – 8 carbon atoms and n is the number 3 or 4.

Without activation of the finely distributed oxide particles, which can be carried out according to the processes disclosed in German patent applications P 17 67 226.3 and P 20 04 443.3, the products either show no hydrophobic characteristics, or when large quantities of organosilicon compounds only are used, they possess insufficient hydrophobic characteristics.

All kinds or types of organosiloxanes, organoalkoxy silanes or organoalkoxy siloxanes of the general formulas stated above can be used. Combinations of organosilicon compounds can also be used. However, preferred organoalkoxy silanes or organoalkoxy siloxanes are the reaction products of alcohols with organotrihalogen-silanes. In the preparation of these organoalkoxy silanes, any imaginable alcohol -- even mixtures of various alcohols -- can be used. It is not necessary that the organoalkoxy silanes which are used according to the invention be liquids. Even thin liquids and solid substances -- insofar as they are available in a suitable form for distribution -- can indeed be used with equally good success.

Alkyltrichlorosilanes readily react with alcohols according to the following equation:

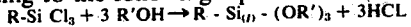
$$R\text{-}Si\ Cl_3 + 3\ R'OH \rightarrow R\text{-}Si_{(t)}\text{-}(OR')_3 + 3HCL \qquad (1)$$

to form the alkyl-trialkoxysilanes (I). Frequently, the alkylalkoxy silanes (II) are derived from (I):

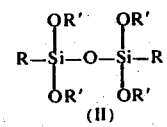

Also, alkyl-alkoxy polysiloxanes (III) develop in a similar manner:

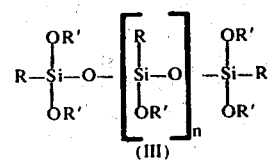

In formulas (I), (II) and (III), R is an alkyl radical having about 1 – 12 carbon atoms or an aryl radical, R' is an alkyl radical having about 1 – 8 carbon atoms, and n is the number 0 or 1. Preferably, the sum of the number of carbon atoms in any radical R plus the number of carbon atoms in any other radical R' does not substantially exceed 9 or is 9 or less.

Both the alkoxysilanes (I) as well as the siloxanes (II) and (III) can be used alone or in mixtures in the process of this invention.

It is really noteworthy that organoalkoxypolysiloxanes (III) which develop as by-products in small or large quantities, depending on the alcohols used, during the production of the organoalkoxysilanes, can be used with equally good results.

Surprisingly, the reaction mixture which develops during the production of the organoalkoxysilanes or organoalkoxypolysiloxanes can also be used directly in the process of this invention. As a result, the process of this invention becomes more economical, since expensive steps for separating the individual organosilicon reaction products can be omitted.

The process of this invention is advantageous because the process uses ammonia catalysis, and a neutral hydrophobic product is obtained even if the reaction mixture contains remnants of gaseous hydrogen chloride. In such reactions, small quantities of ammonium chloride can develop from side reactions. This generally causes no problem, and therefore, the organoalkoxysilanes or organoalkoxy-oligo-siloxanes do not have to be present as technically pure products.

In other cases, there are stricter requirements, and even traces of ammonium chloride in the hydrophobic products are undesirable. Thus, alkyl-alkoxy silanes or siloxanes used can be freed of HCl and/or chlorosilanes during their production or during the separation from their reaction mixture by treatment with ammonia in a manner known per se. This does not constitute the object of the present invention.

The organosilicon compound employed in the process of this invention can also be an organoalkoxy siloxane or an organoalkoxy polysiloxane of the formula:

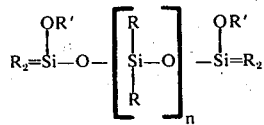

wherein R is an alkyl radical having about 1 – 8 carbon atoms or an aryl radical, R' is an alkyl radical having about 1 – 8 carbon atoms, and n is the number 0, 1 or 2. Preferably, the sum of the number of carbon atoms in any radical R plus the number of carbon atoms in any other radical R' does not substantially exceed 9 or is 9 or less.

Further, the organosilicon compound can be an organocyclosiloxane of the formula:

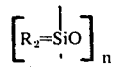

wherein R is $CH_3$ or $C_2H_5$ and n is a number selected from 3 – 10. There can also be employed an organosiloxane of the formula:

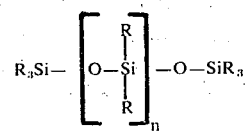

wherein R is $CH_3$, an alkyl radical having about 2 – 4 carbon atoms or an aryl radical, and n is a number selected from 0 – 8. Preferably, the organosiloxane is hexamethyl-disiloxane.

It is apparent that one skilled in the art can select the alcohols and organohalogen silanes so that the organosilicon compounds will require the least industrial expenditure when used in the process of this invention.

The hydrophobic product can be most easily prepared by adding the organosilicon compound to the activated oxide, such as silicic acid, in any desired container. The organosilicon compound can be stirred in, sprayed in in the form of droplets, or introduced in the form of vapor, possibly in a mixture with a stream of inert gas.

Depending on the organosilicon compound used and its radicals R, and especially R' and the temperature, completely hydrophobic products can be obtained within a few seconds to several hours with the addition of gaseous $NH_3$. This is indeed surprising, since experiments have shown that other amines, for example, pyridine or n-dibutylamine show virtually no catalytic effect whatever even after weeks of reaction time.

It is particularly surprising that completely hydrophobic products will be obtained after 3 – 30 minutes even at room temperature (e.g. about 20° – 25°C) with the use of the more volatile alkyl-alkoxy silanes. Compounds having boiling points below about 200°C, at standard pressure, and radicals R and R' with up to about 6 or 8 carbon atoms, insofar as R is large and R' is small or vice versa, are to be considered as the more volatile alkyl-alkoxy silanes.

In many cases, for example, for the use in silicone rubber, a product is desired which is completely free of volatile compounds, and which moreover is neutral. The process of this invention in which an alkyl-alkoxy silane derived from the more volatile alcohols is used, fulfills this requirement.

It has surprisingly been found that silicas activated in accordance with the above mentioned processes yield completely hydrophobic products without any particular technical arrangements in a few minutes at room temperature (e.g. about 20° – 25°C) even when using alkyl-alkoxy silanes with a longer alkyl chain. A completely hydrophobic product, which can be easily freed of $NH_3$ and methanol at room temperature by a stream of inert gas in a simple countercurrent fluidized bed can be obtained, for example, by reacting n-hexyl-trimethoxysilane with an activated pyrogenic silica for about 3 minutes after mixing.

Without the use of $NH_3$ completely hydrophobic products are obtained after very long reaction times by treating activated silicic acids with organoalkoxysilanes at room temperature and without the use of a catalyst. No hydrophobic products are obtained with organosiloxanes, for example $D_4$, under the same conditions even after a very long reaction period.

Therefore, it is surprising that according to the process of this invention, and even with the use of organosiloxanes (in place of the organoalkoxysilanes or siloxanes), completely hydrophobic products can be obtained with relative ease. In this variation of the process of this invention, there are organo groups on the surface of the hydrophobed silicic acids, which is a desirable variation of particles treated with organoalkoxysilanes or siloxanes, which besides organo groups can have organooxy groups on their surfaces.

In practicing the process of this invention, a continuous method of production is preferred. This can be accomplished by mixing the activated oxides with the organosilicon compound and $NH_3$ in a fluidized bed in a manner known per se. The reaction mixture then passes through a shorter or longer tarrying zone, and is subsequently passed through a counter-current fluidized bed in which ammonia, and possibly alcohol, is removed and carried out by means of a stream of inert gas.

Hydrophobic products, which are free of volatile compounds and chemically neutral, could be obtained previously only by high temperature processes.

The process of this invention will be more clearly understood by reference to the following examples.

EXAMPLE 1

500 g of a pyrogenic silicic acid (surface area 120 m$^2$/g BET) are sprayed with 40 g (of 8% by weight) of n-propyltri-isopropoxy silane (MG 248.4) while stirring and after activation at standard pressure and ambient temperature After 1 hour, a dry $NH_3$ stream of gas is conducted for 2 – 3 seconds over the product, after which, the particles are shaken up a few times.

10 minutes after feeding in the ammonia, the product is no longer wetted by water.

A sample tested prior to the ammonia being fed in is completely wetted by water.

EXAMPLE 2

500 g of pyrogenic silicic acid (surface area 120 m$^2$/g BET) are placed in a container after activation, put under vacuum and 70 g (of 14% by weight) of a mixture of $C_6 – C_8$ alkyl trimethoxysilane (average molecular weight 220, 36, b.p.$_3$ 54° – 56°C) are added drop by drop within a short time, while the vessel is briskly agitated. After the vacuum is neutralized, by nitrogen, a dry $NH_3$ stream gas is introduced for 2 – 3 seconds onto the product.

All manipulations -- except the activation -- are carried out at ambient temperature (20°C).

After 1 hour, the product can no longer be wetted by water, it has a surface area of 76 m$^2$/g (BET) and a carbon content of 5.86%.

EXAMPLE 3

500 g of a pyrogenic silicic acid (surface area 120 m$^2$/g BET) are put into a vessel after activation, placed under a vacuum, and 100 g (of 20% by weight) n-propyl-tris-2-ethylhexoxy silane (molecular weight = 458.8; b.p.$_3$ 182°/183°C), heated previously to 50°C, are added drop by drop at ambient temperature within a short time, during which time the contents of the vessel are briskly agitated. After the vacuum is neutralized by $N_2$, a dry $NH_3$ gas stream is introduced onto the product for 2 – 3 seconds. A sample drawn 5 minutes after ammonia is conducted through is found to be completely hydrophobic. Surface area 70 m$^2$/g (BET), carbon content 7.9%.

EXAMPLE 4

500 g MOX 80 (surface area 80 m$^2$/g BET) are reacted after activation and while stirring with 35 g (of 7% by weight) n-propyl-trimethoxy silane (molecular weight 164.3; b.p.$_{745}$ 146°) at ambient temperature.

After 5 minutes a dry stream of $NH_3$ gas is introduced into the product for 2 – 3 seconds.

A sample taken 3 minutes after conducting the ammonia through is completely hydrophobic.

EXAMPLE 5

500 g of a precipitated silicic acid (surface area 150 m$^2$/g BET) is sprayed after activation while stirring with 75 g (of 15% by weight) n-propyl-tri-nbutoxy-silane (molecular weight 290.5: b.p.$_2$ 97°) at ambient temperature.

After 5 minutes and while stirring, a dry $NH_3$ gas stream is conducted through the mixture for 2 – 3 seconds. After that it is briskly shaken.

Ten minutes after feeding in the ammonia, the product is no longer wetted by water.

EXAMPLE 6

500 g of a pyrogenic silicic acid (surface area 120 m$_2$/g BET) are placed after activation into a vessel and put under vacuum, and 75 g (of 15% by weight) di-n-propyl-tetra-n-butoxy disiloxane (molecular weight 530.8; b.p.$_{0.5}$ 174°–184°), heated previously to 60°C, are added drop by drop within a short time while shaking at ambient temperature.

After ½ hour the vacuum at ambient temperature is neutralized, and a dry $NH_3$ gas stream is conducted through the mixture for 2 – 3 seconds.

After shaking, the product is freely flowing. A sample taken after 6 hours is completely hydrophobic.

EXAMPLE 7

60 g $D_4$ (octamethylcyclotetrasiloxane) are dripped into 300 g of a pyrogenic silicic acid (surface 200 m$^2$/g) after previous activation, followed by contacting with ammonia for one second while shaking at standard pressure and ambient temperature. After all the $D_4$ has been added, it was shaken for another 10 minutes. Subsequently $NH_3$ gas is introduced into the mixture while shaking for 2 – 3 seconds.

A sample drawn at ambient temperature after standing two days can no longer be wetted by water.

EXAMPLE 8

500 g of a mixed oxide (surface area 80 m$^2$/g BET) are placed in a vessel after activation, put under vacuum and into it is sprayed at ambient temperature (20°C) 35 g (of 7% by weight) octamethylcyclotetrasiloxane ($D_4$) within a short time and while shaking.

After 1/2 hour, the vacuum is neutralized by $N_2$ and a dry $NH_3$ stream of gas is conducted for 2 – 3 seconds through the mixture, whereby one can immediately and clearly recognize an essentially improved flow behavior.

A sample taken after 3 days standing at ambient temperature is entirely hydrophobic.

In a preferred embodiment of the process of this invention, the activated particles, ammonia and organosilicon compounds are contacted at a pressure of about $10^{-3}$ to about 1000 TORR to render the particles hydrophobic. In a further prepreferred embodiment the pressure is substantially atmospheric pressure.

What is claimed is:

1. A process for preparing hydrophobic finely divided oxides of metals or oxides of silicon comprising activating finely divided particles of oxides of metals, oxides of silicon or mixtures of these oxides by heating the particles at about 700° – 1000°C for less than about 60 seconds in a stream of inert gas to completely free the particles of physically adsorbed and chemically bonded water, contacting the activated particles with at least one organosilicon compound and anhydrous ammonia gas for less than about 60 seconds at a temperature of about 20° – 100°C.

2. Process of claim 1 in which the activated particles are first contacted with the ammonia gas, then contacted with the organosilicon compound.

3. Process of claim 1 in which the activated particles are first contacted with the organosilicon compound then contacted with the ammonia gas.

4. Process of claim 1 in which the activated particles are contacted with the organosilicon compound and ammonia gas simultaneously.

5. Process of claim 1 in which the particles are activated in a fluidized bed.

6. Process of claim 1 operated on a continuous basis by continuously contacting the oxide particles with the organosilicon compound and ammonia in a fluidized bed.

7. Process of claim 1 in which the organosilicon compound is an organoalkoxy silane of the formula:
$R_n Si (OR')_{4-n}$
in which R is an alkyl radical having 1 – 12 carbon atoms or an aryl radical, and R' is an alkyl radical having 1 – 8 carbon atoms, and n is the integer 1, 2 or 3.

8. Process of claim 7 in which the organoalkoxy silane has the formula:
$R_2 Si (OR')_2$
in which R is an alkyl radical having 1 – 8 carbon atoms or an aryl radical, and R' is an alkyl radical having 1 – 8 carbon atoms.

9. Process of claim 7 in which the organoalkoxy silane has the formula:
$R - Si (OR')_3$
wherein R is an alkyl radical having 1 – 12 carbon atoms or an aryl radical, and R' is an alkyl radical having 1 – 8 carbon atoms.

10. Process of claim 1 in which the organosilicon compound is an organoalkoxy siloxane or an organoalkoxy-oligo siloxane of the formula:

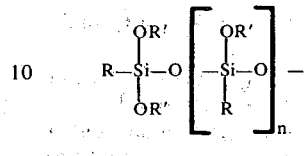

wherein X is R or OR', Y is R of OR', R is an alkyl radical having 1 – 8 carbon atoms or an aryl radical, and R' is an alkyl radical having 1 – 8 carbon atoms, and n is the number 0 or 1.

11. Process of claim 1 in which the organosilicon compound is an organoalkoxy siloxane or an organoalkoxy polysiloxane of the formula:

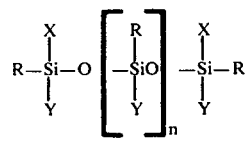

wherein R is an alkyl radical having 1 – 8 carbon atoms or an aryl radical, R' is an alkyl radical having 1 – 8 carbon atoms, and n is the number 0, 1 or 2.

12. Process of claim 10 in which the organoalkoxy siloxane or organoalkoxy-oligo siloxane has the formula:

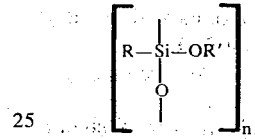

wherein R is an alkyl radical having 1 – 12 carbon atoms or an aryl radical, and R' is an alkyl radical having 1 – 8 carbon atoms, and n is the number 0 or 1.

13. Process of claim 1 in which the organosilicon compound is an organoalkoxy cyclosiloxane of the formula:

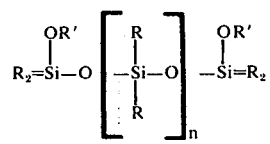

wherein R is an alkyl radical having 1 – 12 carbon atoms or an aryl radical, and R' is an alkyl radical having 1 – 8 carbon atoms and n is the number 3 or 4.

14. Process of claim 7 in which the sum of the number of carbon atoms in any radical R plus the number of carbon atoms in any other radical R' does not substantially exceed 9.

15. Process of claim 14 in which the sum is 9 or less.

16. Process of claim 11 in which the sum of the number of carbon atoms in any radical R plus the number of carbon atoms in any other radical R' does not substantially exceed 9.

17. Process of claim 16 in which the sum is 9 or less.

18. Process of claim 12 in which the sum of the number of carbon atoms in any radical R plus the number of carbon atoms in any other radical R' does not substantially exceed 9.

19. Process of claim 18 in which the sum is 9 or less.

20. Process of claim 14 in which either the radical R or the radical R' in the organoalkoxy silane has as large a number of carbon atoms as possible.

21. Process of claim 14 in which the R of the organoalkoxy silane has 3 – 8 carbon atoms and the R' has 1 – 3 carbon atoms.

22. Process of claim 14 in which the R of the organoalkoxy silane has 6 – 8 carbon atoms and the R' is methyl.

23. Process of claim 1 in which the organosilicon compound is an organosiloxane of the general formula:

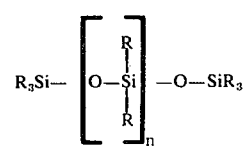

wherein R is $CH_3$, an alkyl radical with 2 – 4 carbon atoms or an aryl radical, and n is the number 0 – 8.

24. Process of claim 23 in which the organosiloxane is hexamethyl-disiloxane.

25. Process of claim 1 in which the organosilicon compound is an organocyclosiloxane of the formula:

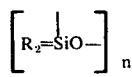

wherein R is CH$_3$ and n is a number selected from 3 – 10.

26. Process of claim 1 in which octamethyl-cyclotetrasiloxane (D$_4$) is the organosilicon compound.

27. Process of claim 1 in which the organosilicon compound is an organoalkoxy silane, an organoalkoxy polysiloxane, an organosiloxane, or an organo-cyclosiloxane.

28. Process of claim 27 in which the organosilicon compound is mixed with the oxides at a temperature above about 20°C.

29. Process of claim 28 in which mixtures of oxides are treated.

30. Process of claim 28 in which oxides are gassed at ambient temperature with anhydrous NH$_3$.

31. Process of claim 29 in which oxides are gassed at ambient temperature with anhydrous NH$_3$.

32. Process of claim 27 in which the organosilicon compound is mixed with the oxides at standard pressure and ambient temperature, and the resulting mixture is gassed with anhydrous NH$_3$.

33. Process of claim 27 in which the oxide is precipitated silicic acid or pyrogenic silicic acid.

34. Process of claim 5 in which the activated particles are contacted with ammonia gas immediately after activation.

35. Process of claim 25 in which oxides are gassed immediately behind the activation zone with anhydrous ammonia.

36. Process of claim 26 in which oxides are gassed immediately behind the activation zone with anhydrous ammonia.

37. Process of claim 7 in which the aryl radical is phenyl or naphthyl.

38. Process of claim 8 in which the aryl radical is phenyl or naphthyl.

39. Process of claim 9 in which the aryl radical is phenyl or naphthyl.

40. Process of claim 10 in which the aryl radical is phenyl or naphthyl.

41. A continuous process for preparing hydrophobic finely divided oxides of silicon, said process comprising activating finely divided particles of precipitated silicic acid, pyrogenic silicic acid or mixtures thereof by heating said particles at about 700° – 1000°C for less than about 60 seconds in a stream of inert gas to completely free the particles of physically adsorbed and chemically bonded water, and contacting the resulting activated particles with at least one organosilicon compound and anhydrous gas for less than about 60 seconds at a temperature of about 20° – 100°C.

42. Process of claim 41 in which the activated particles, organosilicon compound and anhydrous ammonia gas are contacted at standard pressure.

43. Process of claim 42 in which the activated particles, organosilicon compound and anhydrous ammonia gas are contacted at ambient temperature.

44. Process of claim 42 in which the activated particles, organosilicon compound and anhydrous ammonia gas are contacted at a temperature above about 20°C.

45. Process of claim 43 in which the organosilicon compound is linear hexamethyl-cyclotrisiloxane (D$_2$), cyclic hexamethyl-cyclotrisiloxane (D$_3$), octamethyl-cyclotetrasiloxane (D$_4$), hexamethyl-disiloxane n-propyl-triisopropyl silane, a mixture of C$_6$-C$_8$ alkyl trimethoxysilane, n-propyl-tris-2-ethylhexoxy silane, n-propyl-n-butoxy silane, and di-n-propyl-tetra-n-butoxy disilane.

46. Process of claim 1 in which the organosilicon compound is linear hexamethyl-cyclotrisiloxane (D$_2$), cyclic hexamethyl-cyclotrisiloxane (D$_3$), octamethyl-cyclotetrasiloxane (D$_4$), hexamethyl-disiloxane, n-propyl-triisopropyl silane, a mixture of C$_6$-C$_8$ alkyl trimethosysilane, n-propyl-tris-2-ethylhexoxy silane, n-propyl-n-butoxy silane, and di-n-propyl-tetra-n-butoxy disilane.

47. Process of claim 41 in which said activated particles are contacted with the ammonia gas and organosilicon compound at atmospheric pressure.

48. Process of claim 41 in which said activated particles are contacted with the ammonia gas and organosilicon compound at about 10$^{-3}$ to about 10$^3$ torr.

* * * * *